United States Patent [19]
Lauge et al.

[11] 3,724,978
[45] Apr. 3, 1973

[54] ROTATABLE EXTRUSION APPARATUS

[75] Inventors: Raitis Lauge, Point Claire, Quebec; Edward Raymond Hart, Pointe-aux-Trembles, Quebec, both of Canada

[73] Assignee: Union Carbide Canada Limited, Toronto, Ontario, Canada

[22] Filed: Oct. 27, 1971

[21] Appl. No.: 192,969

[52] U.S. Cl. ............................425/86, 425/326, 425/381
[51] Int. Cl. ..............................................B28b 21/36
[58] Field of Search........425/72, 326, 387, 381, 380, 425/190, 191, 192, 86, 465, 466; 164/85; 65/183

[56] References Cited

UNITED STATES PATENTS

| | | |
|---|---|---|
| 3,445,891 | 5/1969 | Thordarson............................425/72 |
| 3,532,780 | 10/1970 | Kakutani et al. ..................425/86 X |
| 3,590,432 | 7/1971 | Schott, Jr. ........................425/381 X |
| 3,650,649 | 3/1972 | Schippers......................425/325 X |
| 3,663,133 | 5/1972 | Augustin et al. .......................425/72 |

Primary Examiner—J. Spencer Overholser
Assistant Examiner—Brian P. Ross
Attorney—William George Hopley

[57] ABSTRACT

An apparatus for extruding thermoplastic film is disclosed which includes a fully rotational die and an internal cooling means. The die and internal cooling means is rotatable relative to a reservoir for cooling liquid positioned below the die and coaxial therewith. As the die rotates, inlet and outlet conduits of the internal cooling means trace a circular path through the reservoir.

3 Claims, 1 Drawing Figure

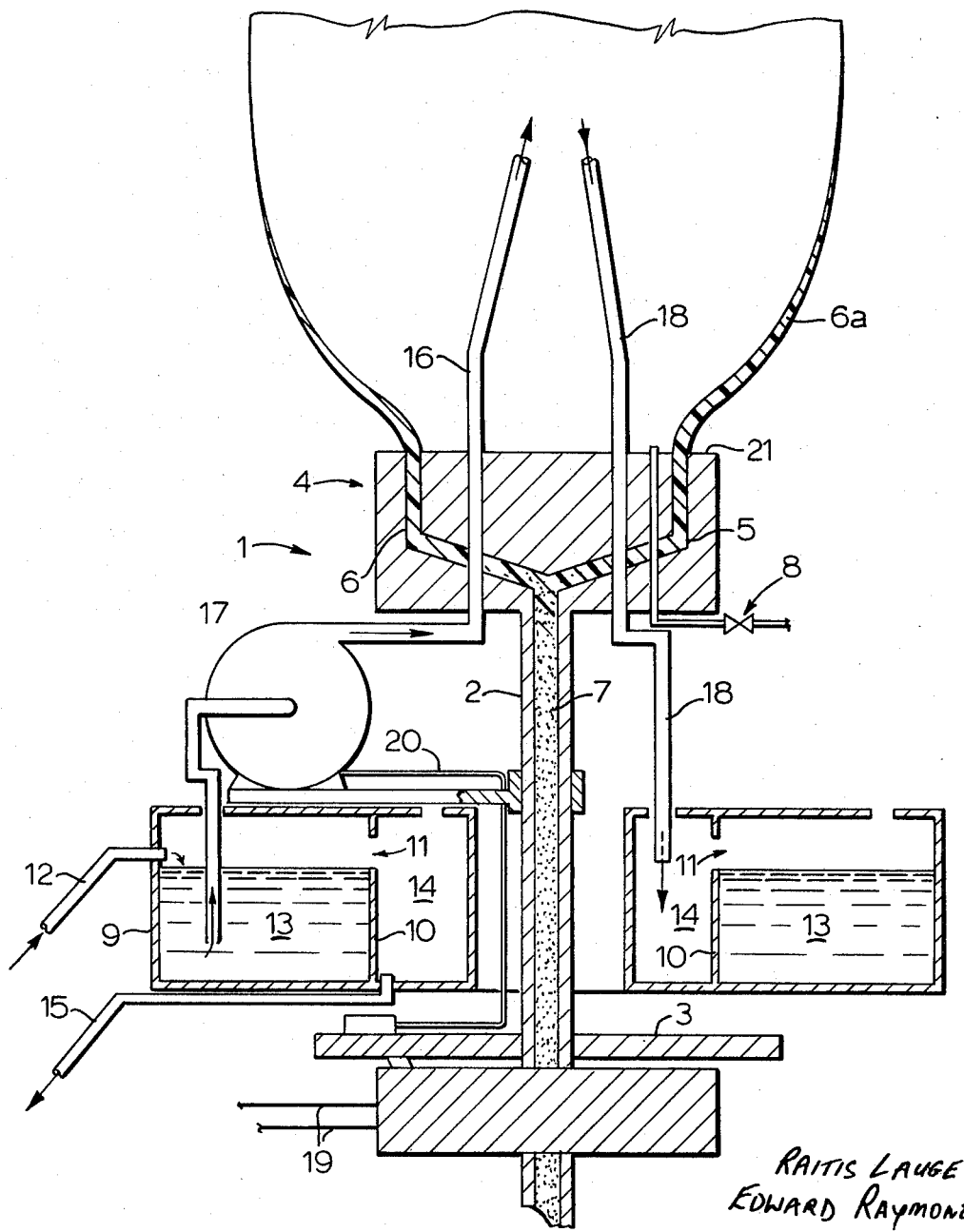

ROTATABLE EXTRUSION APPARATUS

This invention relates to an improvement in an apparatus for extruding thermoplastic tubing. More particularly, it relates to an apparatus which permits the use of a liquid medium internal bubble heat exchanger together with a fully rotational extrusion die, thus improving the roll layflat of the film produced.

Apparatus for extruding thermoplastic film consisting of an annular die for extruding thermoplastic material, an internal cooling mandrel and a gas inlet for supporting a bubble of thermoplastic tubing between the die and the internal mandrel are well known in the art. For example, one such apparatus is described by Gerow in his Canadian Pat. No. 590,407.

Tubing produced from conventional stationary dies however shows a variation in thickness or gauge due largely to slight variations in the width of the annular mouth of the die, and to other die non-uniformities (e.g. cold or hot spots and melt hangup spots in the die). When the extruded film from a conventional die is wound on a roll for storage or further processing, even slight variations in film gauge will result in non-uniform roll build-up because of the non-uniformity of the film. This occurs even with a variation in film gauge of ± 10 percent, which is generally considered good thickness control on a conventional annular die. This means that the variation from the thickest point on the film to the thinnest point may be as great as 20 percent of the average film thickness. When such film is wound on a roll consisting of say a thousand layers of such film, the build-up of thick and thin spots results in extreme non-uniformity in the thickness of the roll. The thick sections would be very tightly wound and would appear as a ridge or bulge while the thin sections would be soft. Wrinkles may thereby result in the roll depending on the severity of the problem. The roll of film thus exhibits what is known as poor layflat - such a roll has a poor appearance, and is difficult to process further in converting operations.

One attempt at improving the quality of film layflat and roll formation was the use of an apparatus having a rotational die. With a rotational die, unevenness in the die will not show up along one particular length of the film but will be distributed around the circumference of the film tube as it is being extruded. As a result of the gauge variations of the film being more evenly distributed, any bulges in such film would eventually fit into the thinner portions of film as it is wound on the roll since the thick area of film does not appear in the same place throughout the extruded film.

Center-fed extrusion dies can be rotated by well known mechanical means, but in the case of an extrusion apparatus which includes an internal heat exchanger such as an internal cooling mandrel the equipment becomes very intricate or cumbersome to handle. Since the heat exchanger must be connected to a liquid recirculation system including a draining system, the apparatus must include some provisions for a rotating liquid connection, or limit the rotation of the die to a 180° turn in one direction and then alternating the direction of rotation to rotate another 180° in the other direction to thereby provide oscillation of the die. Full rotation of the die gives best 'lay-flat' properties in the film; however, the connector means for the internal heat exchanger in such an apparatus, as mentioned above requires elaborate rotating joints which are expensive and frequently subject to leakage.

The applicant has devised an improved extrusion apparatus which permits full rotation of the die and internal heat exchanger and permits a relatively simple and inexpensive means of coupling the heat exchanger with the fluid recirculation system.

It is therefore an object of this invention to provide an improved apparatus for extruding thermoplastic tubing, containing a fully rotational die and internal heat exchanger.

This object is obtained by an improved extrusion apparatus in which said apparatus comprises an apparatus for extruding thermoplastic tubing comprising a vertical shaft having a die mounted on its upper end, said die having an annular extrusion orifice, means for feeding melted thermoplastic material into a chamber in said die which communicates with the annular extrusion orifice, an internal cooling means for said thermoplastic tubing mounted above said die, a gas inlet means in said die for maintaining a bubble in the extruded thermoplastic tubing, a reservoir for liquid coolant positioned below said die and an inlet and an outlet conduit in said internal cooling means which passes through the die and communicates with said reservoir, the improvement comprising a driving mechanism for rotating said vertical shaft, die and internal cooling means about the axis of said shaft, said reservoir being positioned around said shaft and spaced therefrom, said inlet and outlet conduits of the internal cooling means leading into the reservoir and each of said conduits defining a circular path through the reservoir when said shaft Is rotated, said shaft constituting the center of each of said circles.

The single FIGURE of drawings shows a sectional elevation of the liquid recirculation apparatus in partially schematic form, including the extrusion of a section of thermoplastic tubing.

In the FIGURE of drawings the apparatus shown generally as 1 includes a hollow shaft 2 vertically mounted on a driving mechanism shown diagramatically at 3 which rotates the shaft. The housing for the driving mechanism is otherwise rigidly secured. An annular center-fed die 4 is mounted on the upper end of shaft 2 and includes a die chamber 5 through which molten thermoplastic material 6 may be fed from the central passage 7 of shaft 2. This thermoplastic material which is kept molten in the die by a heating means (not shown) is extruded from the mouth of the die to form a bubble of thermoplastic tubing 6a. An air inlet pipe 8 with accompanying flow control valve is shown passing through die 4 whereby pressurized air is injected into the tubing to maintain the bubble and keep the tube from collapsing. When a length of tubing is extruded and an air bubble entrapped therein, the control valve may be closed and inlet pipe is disconnected from its source of pressurized air.

In the drawings, only the lower portion of the extruded tubing 6a is shown and the inlet and outlet conduits 16 and 18 leading to and from the internal cooling device (not shown) are shown in schematic form with arrows Indicating the direction of the cooling fluid passing therethrough. A liquid reservoir 9 is positioned around shaft 2 below the extrusion die, externally mounted and spaced from the shaft and independently secured in position from the rotatable parts of the apparatus. The interior of the reservoir is divided into a supply chamber 13 and an overflow chamber 14 each of which is concentric with the shaft 2. The two chambers are separated by wall 10 which contains ports 11 located periodically in the wall at the upper end of the reservoir. Liquid supply conduit 12 leads into the supply chamber 13 to deliver cooling fluids such as water to the reservoir. When the supply chamber 13 is filled with the cooling fluid up to the ports 11 the fluid overflows into the overflow chamber 14. Fluid discharge conduit 15 which is connected to the bottom of chamber 14 drains the overflow cooling liquid to a sink where it may be discarded or recirculated into the system. By continually passing cooling fluid via liquid supply conduit 12 into the supply chamber 13 of reservoir 9 and continually draining the overflow via fluid discharge conduit 15, a continuous fluid supply is maintained in the supply chamber 13.

Inlet conduit 16 of the heat exchanger has a pump 17 connected in series and has its inlet end connected in supply chamber 13 whereby fluid from chamber 13 may be pumped via conduit 16 into the heat exchanger (not shown). Outlet conduit 18 of the heat exchanger leads into overflow chamber 14 whereby the fluid discharging from the heat exchanger may be drained or subsequently recirculated.

When a length of tubing has been extruded and an air bubble entrapped to start up the apparatus, the air control valve is closed and pipe 8 is disconnected from its air source to enable it to be freely rotatable with the die. Mechanical driving means 3 is then activated and shaft 2, die 4 and inlet and outlet conduits 16 and 18 as well as the internal heat exchanger (not shown) are rotated. Pump 17 which is mounted on a swivel platform 20 secured to the shaft is also rotated. The reservoir 9 however does not rotate. When the shaft is rotated the inlet conduit 16 travels a path through supply chamber 13 circumferential to the axis of said shaft and outlet conduit 18 travels a path in overflow chamber 14 which is also circumferential to the axis of shaft 2. As the shaft is rotated, thermoplastic material continues to be forced up the central passage 7 of shaft 2 by an extruding means (not shown) and into die chamber 5 where it is subsequently extruded through the annular mouth of the die to form the thermoplastic tubing. If, for Instance, the die mouth contains an enlarged section indicated as 21 the film extruded at this point will be slightly thicker than the film extruded through the rest oh the annular mouth. As the die rotates, however, the thicker portion continues to be extruded at different points along the circumference so that the resulting tubing exhibits substantially constant layflat when would in a roll.

It must be appreciated that variations can be made in the apparatus without departing from the invention. For example, chamber 13 may consist of a single chamber which contains both the liquid coolant supply and the return liquid from heat exchanger outlet conduit 18. The total volume of liquid coolant in the reservoir in relation to the volume in the heat exchanger may be sufficiently large that the coolant liquid remains at a temperature low enough to provide effective cooling for relatively long periods. Another possible modification is in the means of delivering the thermoplastic material from the extruder to the die. While it is advantageous for efficiency of design to use a central passage in the shaft 2, a separate chamber coaxial with shaft 2 may be used.

We claim:

1. An apparatus for extruding thermoplastic tubing comprising:
    a. a vertical shaft having a die mounted on its upper end, said die having an annular extrusion orifice;
    b. means for feeding melted thermoplastic material into a chamber in said die for communication to said annular extrusion orifice;
    c. an internal cooling means for said thermoplastic tubing mounted above said die and secured thereto;
    d. a gas inlet means in said die for maintaining a bubble in the extruded thermoplastic tubing;
    e. a reservoir for liquid coolant positioned around said vertical shaft below the die and spaced from said shaft;
    f. a driving mechanism for rotating said vertical shaft, die and internal cooling means about the axis of said shaft;
    g. an inlet and an outlet conduit in said internal cooling means each of which passes through the die and leads into the reservoir, each of said conduits defining a circular path through the reservoir when the shaft is rotated.

2. An apparatus as claimed in claim 1 wherein said reservoir defines a supply chamber, an overflow chamber and a port therebetween at the upper end of the reservoir, a liquid supply conduit leading into the supply chamber and a fluid discharge conduit leading from the overflow chamber whereby a continuous source of liquid coolant may be available in the supply chamber for delivery to the internal cooling means via said inlet conduit.

3. An apparatus as claimed in claim 2 wherein said means for feeding melted thermoplastic material into a chamber in said die comprises an axial passage in said shaft communicating between an extruding means for said thermoplastic material and said die chamber.

* * * * *